United States Patent [19]
Short

[11] Patent Number: 6,058,687
[45] Date of Patent: May 9, 2000

[54] GANG MOWER

[76] Inventor: Douglas Short, 12210 Leo Rd., Fort Wayne, Ind. 46825

[21] Appl. No.: 09/211,375

[22] Filed: Dec. 14, 1998

Related U.S. Application Data

[63] Continuation of application No. 08/860,682, Jun. 10, 1997, Pat. No. 5,865,017, which is a continuation of application No. 08/370,664, Jan. 10, 1995, Pat. No. 5,497,603.

[51] Int. Cl.[7] .................................................... A01D 75/30
[52] U.S. Cl. .................................................... 56/7; 56/249
[58] Field of Search ................................ 56/7, 249, 294, 56/15.4, 15.5, 15.6

[56] References Cited

U.S. PATENT DOCUMENTS

| | | |
|---|---|---|
| 1,260,631 | 3/1918 | Braun . |
| 1,279,266 | 9/1918 | Coldwell . |
| 1,607,378 | 11/1926 | Worthington . |
| 1,663,900 | 3/1928 | Braun . |
| 1,712,722 | 5/1929 | Worthington . |
| 1,725,375 | 8/1929 | Seeley . |
| 1,818,487 | 8/1931 | Lontz . |
| 1,900,726 | 3/1933 | Moyer . |
| 1,902,928 | 3/1933 | Worthington . |
| 2,111,016 | 3/1938 | Worthington . |
| 2,139,200 | 10/1938 | Moyer . |
| 2,168,706 | 8/1939 | George et al. . |
| 2,177,189 | 10/1939 | Roseman . |
| 2,659,190 | 11/1953 | Imst . |
| 2,704,921 | 3/1955 | Cunningham, Jr. . |
| 2,725,703 | 12/1955 | Roseman, Jr. . |
| 2,830,421 | 4/1958 | Blue et al. . |
| 3,038,286 | 6/1962 | Hall . |
| 3,058,280 | 10/1962 | Lewis . |
| 3,224,176 | 12/1965 | Taylor . |
| 3,429,109 | 2/1969 | Heth et al. . |
| 3,612,573 | 10/1971 | Hoffman . |
| 3,650,096 | 3/1972 | Caldwell . |
| 3,808,778 | 5/1974 | Hoffmeyer et al. . |
| 4,021,996 | 5/1977 | Bartlett et al. . |
| 4,287,706 | 9/1981 | Tobin, Jr. . |
| 4,330,981 | 5/1982 | Hall et al. . |
| 5,343,680 | 9/1994 | Reichen et al. . |

FOREIGN PATENT DOCUMENTS

| | | |
|---|---|---|
| 93 12 843 | 2/1954 | Germany . |
| 28 42 739 | 8/1980 | Germany . |
| 397726 | 8/1933 | United Kingdom . |
| 714 138 | 5/1954 | United Kingdom . |
| 1 542 092 | 9/1971 | United Kingdom . |
| 1 542 661 | 3/1979 | United Kingdom . |
| 1 245 091 | 9/1979 | United Kingdom . |

OTHER PUBLICATIONS

Author: Agrifab, Inc. Title: Owners Manual for 21'Gang Reel Model No. 's 45–0194, 95. Number of pages: 8. Date Published: Unknown. Place of Publication: Believed to be U.S.

Author: American Lawnmower. Title: Color Photographs of a horse drawng Gang Type Mower. Number of Pages: 2. Date: Believed to be 1998. Photos not believed to have been published but the mower in the photos is alleged to have been on sale and in public use in the U.S.

Author: Unknown. Title: Power Mower Section. Number of Pages: 2;pp. 26 &27. Date: Unknown. Place of Publication: Believed to be U.S.

Author: Worthington. Title: Worthington Rough Grass Blitzer Brochure. Number of pages: 2. Date:Unknown. Place of Publication: Believed to be U.S.

*Primary Examiner*—H. Shackelford
*Attorney, Agent, or Firm*—Michael McNeil

[57] ABSTRACT

A gang mower for garden tractors includes a frame, a hitch and either three, five or seven reel-type mower units attached to the frame. The frame is attached below the forward wheel axis of each mower unit. In action, the frame leverages the forward drive wheels downward to turn the mower blades when the frame is pulled forward by a garden tractor.

12 Claims, 3 Drawing Sheets

GANG MOWER

RELATION TO OTHER PATENT APPLICATIONS

This application is a continuation of U.S. patent application Ser. No. 08/860,682, filed Jun. 10, 1997 now U.S. Pat. No. 5,865,017, and entitled Gang Mower, which was a continuation of U.S. patent application Ser. No. 08/370,664, filed Jan. 10, 1995, and entitled Gang Mower, now U.S. Pat. No. 5,497,603.

FIELD OF THE INVENTION

The present invention relates generally to reel-type gang mowers, and in particular to gang mowers for use with home garden tractors or draft animals.

BACKGROUND OF THE INVENTION

Reel-type gang mowers have long been known in the art, and are most often identified with golf courses and other wide open areas requiring an attractive contoured cut. Gang mowers are often recognized for their ability to mow a given area in a significantly shorter amount of time than that possible with conventional power mowers. This is due in part to the relatively large switch (8 feet or more) possible with gang mowers, whereas power mowers typically cut a swath of four feet or less with each pass. Gang mowers can also usually be pulled faster than a comparable power mower without sacrificing on the quality of the cut. Therefore, not only are gang mowers well known for there ability to make an attractive contoured cut, they are also known to be significantly faster than the largest counterpart power mowers, provided one has a tractor with sufficient power to pull the gang mower.

Most prior art gang mowers are relatively heavy and normally require a relatively powerful tractor to pull the gang mower. In other words, home garden tractors have typically not been sufficiently powerful to pull most commercially available gang mowers. Thus, most if not all homeowners with relatively large estates (several acres or more) must choose between one of a variety of home garden tractors with power mower attachments for use in mowing their large lawns. These tractor power mowers typically have a rotating blade on the order of three feet in diameter but rarely, if ever, exceeding four feet in diameter. This is because larger decks, 40 inches or larger, will often scalp the ground on one side while being too far off the ground on the other when the mower encounters even moderate contouring. Thus, the homeowner that desires an attractive cut must necessarily choose a smaller sized deck and spend multiple hours each week riding his or her lawn mower back and forth around their yard. Reel-type gang mowers have not been a realistic alternative to these homeowners because the gang mowers of the prior art typically require a large storage area, and relatively larger tractors, which are prohibitively expensive and also require their own added storage space.

One of the reasons that gang mowers of the prior art are relatively heavy is because the individual mower units are typically attached to the gang mower frame in a way that requires a relatively large downward force in order to maintain the individual mower units in proper contact with the ground at all times. In particular, prior art gang mower frames are typically attached above and forward from the individual mower units, with the consequence being that the frames (and mower units) must be relatively heavy in order to maintain both the drive wheels and the trailing rollers of the individual mower units in contact with the ground. Examples of such gang mowers include but are not limited to the gang mowers shown in U.S. Pat. No. 1,663,900 to Braun, U.S. Pat. No. 1,902,928 to Worthington and U.S. Pat. No. 2,830,421 to Blue et al.

A more recent gang mower assembly illustrated in U.S. Pat. No. 4,287,706 to Tobin Jr., overcomes some of the weight problems of the prior art to produce a gang mower suitable for use with home garden tractors. Tobin Jr. accomplishes this by making a gang mower frame that attaches to the handle studs of the individual reel-type mower units. Thus, in theory the frame pushes forward and downward on the handle studs of the individual mower units when the frame is pulled forward by a garden tractor. In other words, the individual mowers units are pushed forward when the frame is pulled. While this concept apparently permitted a lower weight frame suitable for use with garden tractors, a number of problems have persisted in the Tobin Jr. gang mower design. Not the least of which is the recognition by Tobin that a spring is often required in order to apply a moment about the handle studs of the mower units in order to help maintain the rollers of the individual mowers on the ground at all times. It is well known that it is absolutely critical for the proper functioning of a reel-type mower that both the drive wheels and the trailing roller always remain in contact with the ground. Tobin Jr., also suffers from a number of other problems that have persisted in the art, including the inability to back up when the gang mower is attached to a tractor, the inability to store the gang mower in a relatively small space, the inability of the gang mower to properly follow lawn contours, and other problems.

In view of the prior art, what is needed is a reel-type gang mower that is low weight, capable of being stored in a relatively small space, is suitable for use with home garden tractors and overcomes many of the practicality problems encountered with the various gang mowers of the prior art.

SUMMARY OF THE INVENTION

In responding to this need, the present invention provides a gang mower for garden tractors comprising a frame, a hitch attached to and extending forward from the frame, and a plurality of reel-type mowers attached to the frame. Each of the reel-type mowers has a pair of forward wheels and a rear roller. The forward wheels are rotatable about a forward axis, and the rear roller is rotatable about a rear axis that is substantially parallel to the forward axis. The frame is attached to each of the reel-type mowers at a position higher than the rear axis, lower than the forward axis and a sufficient distance away from forward axis that a majority of the frame's weight is supported by the rollers of the reel-type mowers instead of by the forward wheels of the reel-type mower units. When in action, the frame pushes the reel-type mower forward when the frame itself is pulled forward by the hitch.

The present invention can include a number of enhancements including the possibility of a frame that is substantially rigid with respect to a vertical axis such that the relative positioning of the reel-type mowers in a plane perpendicular to the vertical axis remain substantially constant regardless whether the gang mower is being pulled forward around curves or pushed backward. Also, the reel-type mowers can be attached to the frame at pivot points that permit the individual mower units to pivot with respect to the frame about horizontal axes through the pivot points. In another enhancement the frame can include a plurality of outer portions that are attached to the central frame at pivot points that permit the outer mower units to pivot about horizontal axes. Both pivoting enhancements allow the mower to follow lawn contours and produce a more attractive cut. Furthermore, the outer frame units and the hitch can be made to pivot to a stowed position so that the gang mower can be stored in a relatively small space. Other aspects and potential enhancements of the invention will be more thoroughly identified and discussed in the detailed description of the invention.

One object of the present invention is to provide a gang mower that will permit a homeowner to mow their lawn in a fraction of the amount of time possible with counterpart power mowers.

Another object of the present invention is to provide a gang mower for garden tractors that overcomes the storage and backing up problems of the prior art.

Still another object of the present invention is to provide a relatively light-weight gang mower.

Still another object of the present invention is to provide homeowners with a professional looking contoured cut to their lawns at a fraction of the price possible with counterpart riding power mowers.

Another object of the present invention is to provide an improved gang mower for garden tractors.

DETAILED DESCRIPTION OF THE PREFERRED EMBODIMENT

Figure 1:
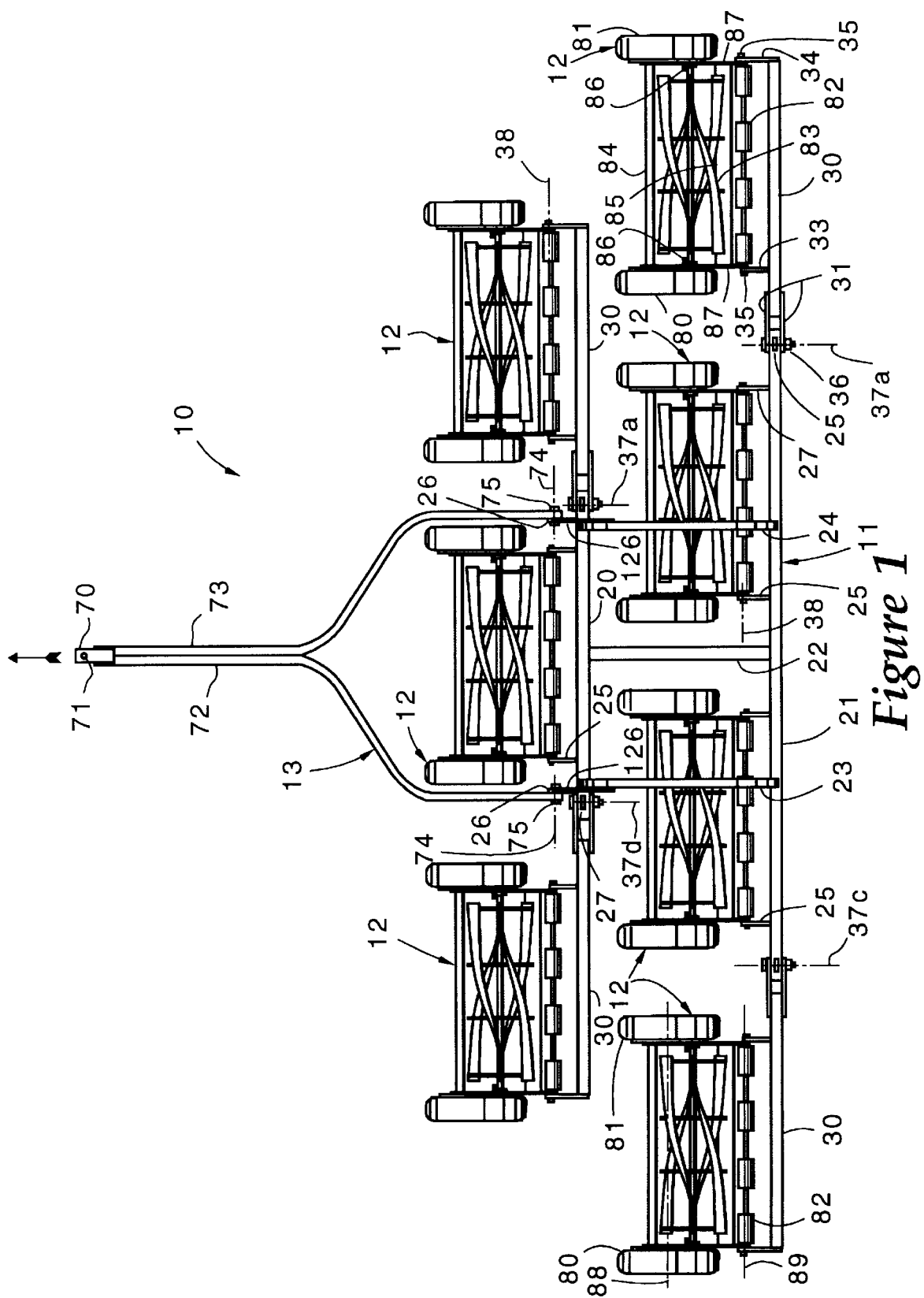
FIG. 1 is a top view of a gang mower for garden tractors according to the present invention.
Figure 2:
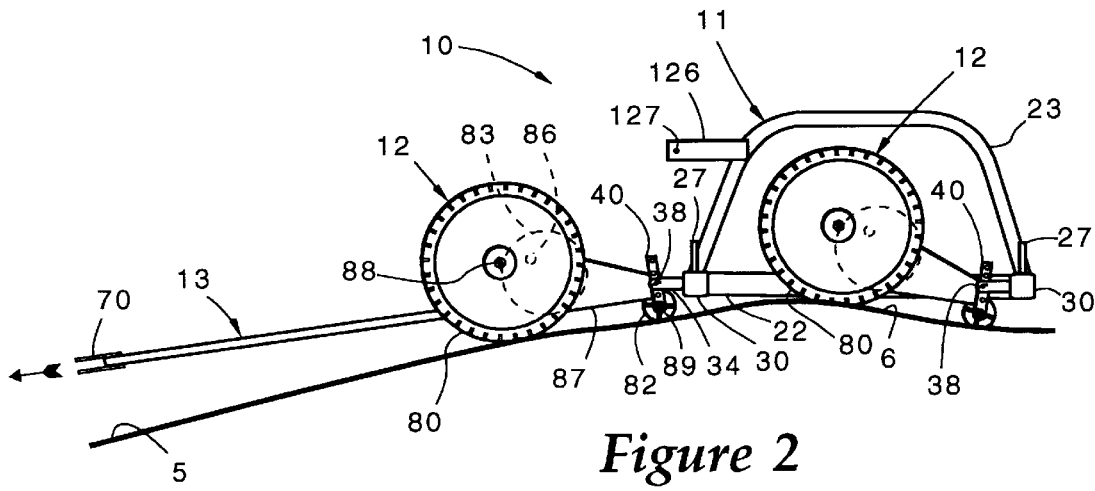
FIG. 2 is a side elevational view of a gang mower for garden tractors according to the present invention.

Referring now to FIG. 1, a gang mower for garden tractors 10 according to the present invention includes a frame 11, a hitch 13 and seven individual reel-type mower units 12. Frame 11 includes a central portion made up of a forward sub-frame 20 and a rearward sub-frame 21 arranged behind and substantially parallel to the forward sub-frame. Sub-frames 20 and 21 are interconnected by a horizontal stiffener 22 and a pair of arched stiffeners 23 and 24. Forward sub-frame 20, rearward sub-frame 21 and horizontal stiffener 22 are preferably made from square metal tubing welded to one another in a conventional manner. Arched stiffeners 23 and 24 are preferably formed from square steel bar stock and welded at each end to the forward and rearward sub-frames. The shape of the arched stiffeners is best illustrated in FIG. 2.

A pair of brackets 25 are welded to extend forward of forward sub-frame 20, and serve as a means by which the central mower in the front row is attached to the frame. Likewise, four substantially identical brackets 25 are welded to extend forward of the rearward sub-frame 21, and serve as a means by which the central two mower units 12 in the second row are attached to the frame. Brackets 25 are preferably cut from steel bar stock, on the order of at least one quarter inch thick, and welded into place. Each of brackets 25 includes a bore that facilitates attachment of the individual mower units 12 through a pin arrangement (best illustrated in FIG. 4) that permits the individual mower units to pivot with respect to the frame about a pivot axes 38. This aspect of the invention allows the individual mower units to independently pivot and follow contours 6 encountered as the gang mower is pulled forward over the ground 5, as shown in FIG. 2.

Hitch 13 is attached to frame 11 via a pair of brackets 26 that are substantially similar to brackets 25 discussed earlier. Brackets 26, which are partially obscured in FIG. 1 by upper brackets 126, are welded to and extend forward from forward sub-frame 20. When the gang mower is reduced to three central mower units and the mower is to be pulled by a draft animal, upper brackets 126 (see also FIG. 2) are used as the mounting location for hitch 13 via bore 127. Upper brackets 126 are welded to arched stiffeners 23 and 24. Hitch 13 includes a pair of symmetrically bent square steel bars 72 and 73. Bars 72 and 73 are bent generally into the shape shown in FIG. 1 and are welded at a number of locations along their contact surfaces. A pair of flanges 70 are attached to one end of bar 72 and 73. Flanges 70 are preferably made from steel bar stock on the order of about one quarter inch in thickness and are machined to include a bore 71, which facilitates hitching the gang mower to an ordinary garden tractor in a conventional manner. The other end of bars 72 and 73 include a bore (not shown) which facilitates the attachment of hitch 13 to brackets 26 via a pair of nut/bolts 75. Thus, hitch 13 has the ability to pivot with respect to frame 11 about axes 74 to better facilitate the gang mower following contours when going over the top of hills or the bottom of valleys between hills. Furthermore, this feature allows the hitch to be pivoted to an upright stowed position (FIG. 3) to better facilitate storing the gang mower in a relatively small space.

Attached to the rigid central frame 11 are four outer sub-frames 30. In particular, FIG. 1 shows a forward left sub-frame, a forward right sub-frame, a rearward left sub-frame and a rearward left sub-frame. Although the outer sub-frames 30 are located in different positions and inverted with respect to one another, their individual structures are substantially identical. In particular, each outer sub-frame 30 includes a length of square tubular stock welded adjacent one end to a pair of extension members 31, which are preferably cut from a length of steel bar stock on the order of about one quarter inch in thickness. Extensions 31 each include a bore that permits attachment to the central frame 11 via a nut/bolt set 36, as best shown in FIG. 4. This permits the outer sub-frames to pivot about individual horizontal axes 37a–d. This allows the outer mower units to float with the contour of the lawn independently of one another. Also, outer sub-frames 30 have the ability to pivot to an upright stowed position (FIGS. 3 and 4) in order to better facilitate storage of the gang mower in a relatively small space. Outer sub-frames 30 also include a pair of brackets 33 and 34 which are substantially similar to brackets 25 discussed earlier, except that bracket 34 is slightly longer and welded to one end of the particular outer sub-frame 30. Brackets 33 and 34 include a bore that facilitates an attachment of a mower unit 12 via a pin arrangement that permits pivoting about a horizontal axis 38. Thus, the outer sub-frames can pivot about first horizontal axes 37a–d and each of the mower units can pivot about a separate and perpendicular horizontal axis 38. This permits the outer mower units to have two degrees of rotational freedom so that gang mower can easily follow virtually any ground contour.

The individual reel-type mower units 12 are commercially available from a variety of known sources, and can be utilized without modification in the present invention. Each mower unit includes a pair of forward wheels 80 and 81 that define a localized forward axis 88. Each mower also includes a rear roller 82 with the ability to rotate about a localized rearward axis 89. Real roller 82 and forward wheels 80, 81 are interconnected via a pair of supports 87. Rotating blades 83 are attached between supports 87 and are driven to rotate adjacent cutting bars 85 when four forward wheels 80 and 81 are rotated in the forward direction. A stabilizer bar 84 extends between brackets 87, and apparently serves to give the individual mower unit 12 greatly rigidity. The mower units also include a pair of handle mounting studs 86 which will be discussed infra in relation to FIG. 5. Thus, mower units 12 are off the shelf components except that the individual handles for the reel-type mowers are excluded. Cutting height can be adjusted by connecting the rear roller 82 to different locations along height adjustment bracket 40 (see FIGS. 2 and 5). Height adjustment brackets are positioned and attached within a channel on supports 87.

The gang mower of the present invention permits a portion of the individual mower units 12 to pivot about a pair of mutually perpendicular horizontal axes with respect to one another. Furthermore, the pivoting ability of the hitch better facilitates cutting over the top and at the bottom of relatively steep hills. However, it should be noted that none of the mower units have the ability to rotate with respect to one another about any vertical axis. This permits the user to back up the gang mower 10 without risking the jack-knifing problems encountered with prior art mower units that have the ability to rotate with respect to one another about a vertical axis. This feature also permits the mower to effectively complete zero radius turns while maintaining the proper overlapping cutting arrangement afforded by the two staggered rows of gang mowers shown in FIG. 1.

Although the gang mower 10 shown in FIG. 1 includes seven individual mower units 12, the present invention can also utilize either five or three mowers if a thinner mower swath is desirable. In its basic form, only the central frame 11 is included with three individual mower units, giving the overall gang mower a cutting swath on the order of about four feet. The next extension up to approximately a six foot cutting swath is accomplished by adding a pair of outer sub-frames 30 to forward sub-frame 20 as discussed earlier. Such a configuration would have three mowers in the front row and two mowers in the back row and have a cutting swath on the order of about six feet or more. The next enhancement comes by adding another pair of mower units 12 to the rearward sub-frame 21 via another pair of outer sub-frames 30. Thus, it should be clear that the present invention has the versatility to accommodate several different cutting swaths to suit virtually any individual user. Furthermore, maintenance on the present invention is relatively low since the individual mower units can be replaced at a relatively low cost and the underlying frame is virtually maintenance free. Prior art mower units are typically specially modified for use in the gang mower and often require costly maintenance and repairs when problems occur.

Figure 3:
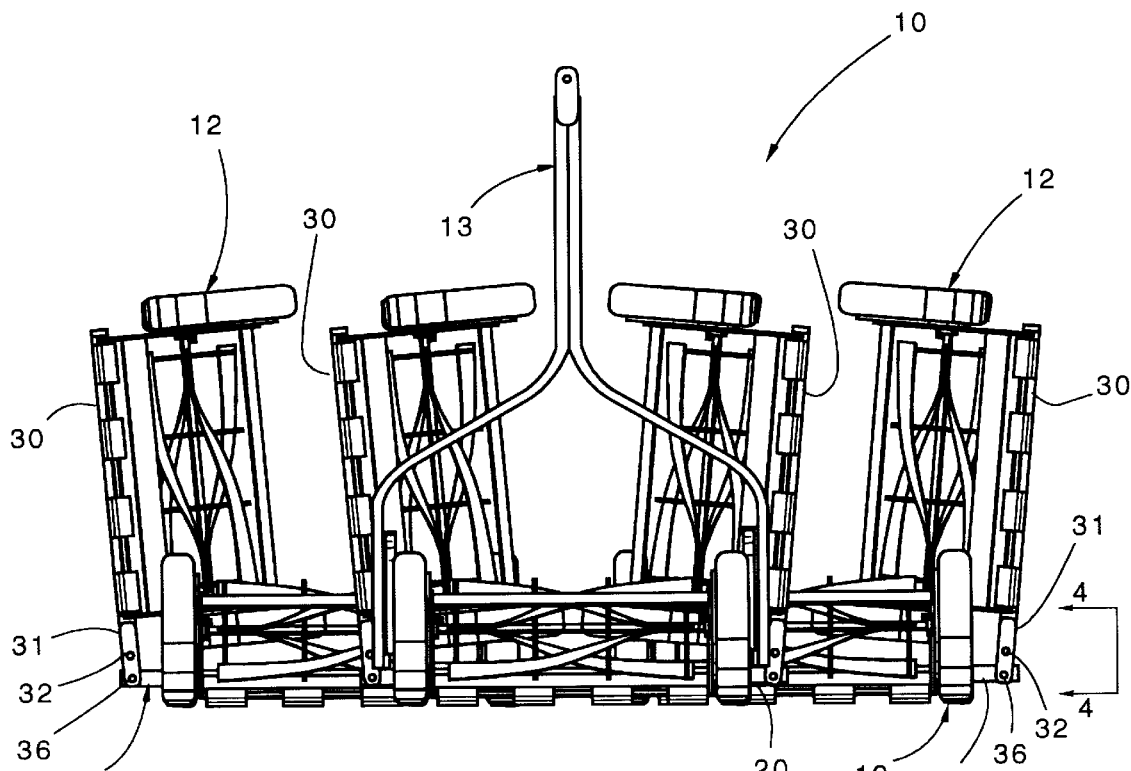
FIG. 3 is a front elevational view of a gang mower for garden tractors according to the present invention in its stowed configuration.
Figure 4:
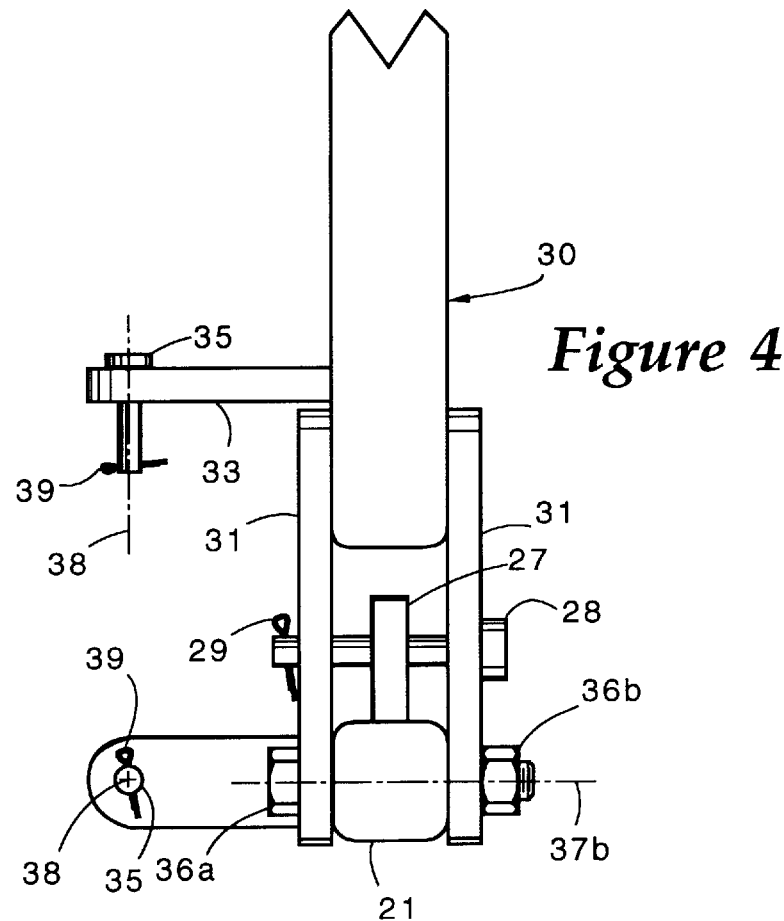
FIG. 4 is an enlarged side elevational view of a portion of a gang mower frame according to one aspect of the present invention.

FIG. 3 shows the gang mower 10 of FIG. 1 in its stowed configuration for storage. Each of the outer sub-frames 30 has the capability of pivoting about its individual axis 37a–d (FIG. 1) to an upright stowed position. The outer sub-frames 30 can be locked in their stowed configuration via the pin arrangement illustrated in FIG. 4. In particular, at the connection with each outer sub-frame 30 an upright bracket 27 is welded to the underlying sub-frame 20 or 21 (see FIGS. 1, 2 and 4). Upright brackets 27 each include a bore which aligns with bores made through extensions 31. When in the stowed configuration, these bores align and permit the insertion of a pin 28 which is kept in place via a retaining pin 29, or another equivalent arrangement known in the art. Thus, each of the outer units is locked in an upright stowed position and the hitch is pivoted to an upright stowed position when it is desired to store the gang mower. If proper clearances are maintained, the gang mower can still be pulled forward or pushed in reverse when in its stowed configuration as shown in FIG. 3. In such a case, the weight of the gang mower, which is typically on the order of about 200 pounds, is supported by the three central mower units. Thus, the user can quickly pivot and lock the outer mower units to their stowed configuration and simply back the gang mower into a storage place within a garage or barn. Gang mower 10 takes up the space about equal to that of a motorcycle when in its stowed configuration, or less than half the space of its deployed configuration as shown in FIG. 1.

FIG. 4 is an enlarged view illustrating the interconnection between rearward right sub-frame 30 and rearward sub-frame 21. Nevertheless, the attachment of each outer sub-frame to the central frame is identical since all the outer sub-frames are structurally identical. As discussed earlier, the framing is attached to the individual mower units via a pin arrangement 35 that permits the mower units to pivot about an axis 38. Outer sub-frame 30 is attached to rearward sub-frame 21 via aligning bores (not shown) which receive a bolt 36a. The bolt is secured in placed with a conventional nut 36b. When the outer sub-frame 30 is pivoted to its upright stowed configuration, the bores in extensions 31 and upright bracket 27 align and permit the insertion of a pin 28. Pin 28 is held in place via a removable retaining pin 29 that is inserted through a hole in one end of pin 28. When the outer sub-frames 30 are lowered into their deployed configuration, pin 28 is reinserted through bracket 27 and left in place until needed. The pin and retaining pin arrangement shown for attaching the frames to the individual mower units and for locking the outer sub-frames in an upright position could have a variety of other mechanical connections substituted therefore which are known in the art. For instance, a nut and bolt arrangement could be substituted for each of the pin/retaining pin connections illustrated.

Figure 5:
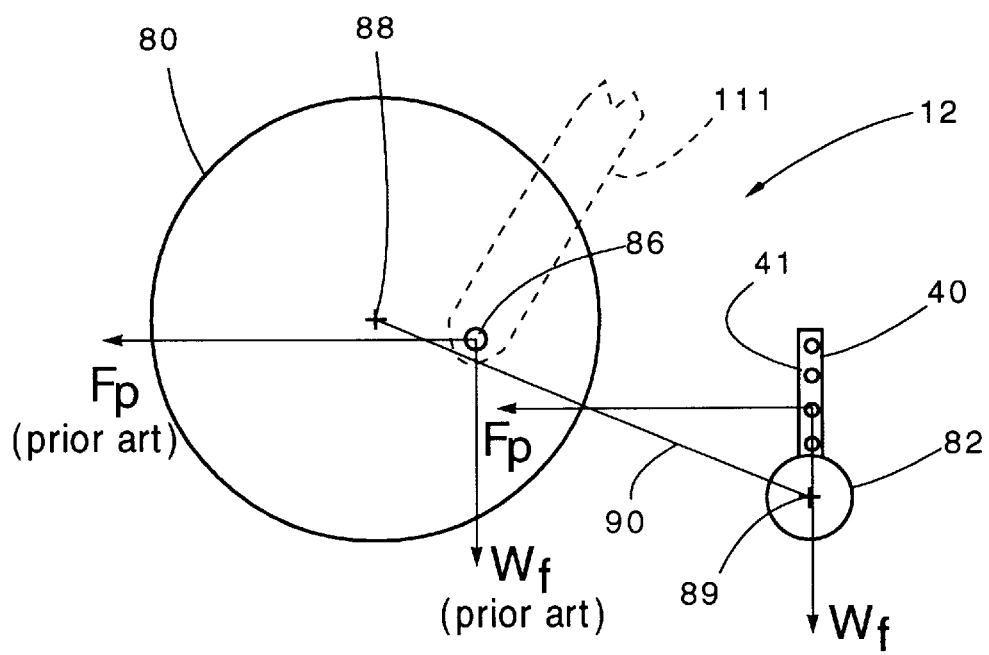
FIG. 5 is a side diagrammatic illustration of a reel-type mower unit contrasting the force distribution of the frame of the present invention versus that of the prior art.

Referring now to FIG. 5, the force distribution aspect of the present invention is contrasted with that of the closest known prior art (U.S. Pat. No. 4,287,706 to Tobin, Jr.). In particular, FIG. 5 shows a diagrammatic view of a mower unit 12 having a forward wheel 80 that is rotatable about a forward axis 88. The rear roller 82, which is rotatable about a rearward axis 89 is attached to the forward mower via a height adjusting bracket 40. The present invention is preferably attached directly above rearward axis 89 so that the weight of the frame (Wf) is supported by the rear rollers. Although the present invention would perform well with the mowers attached either for or aft of rearward axis 89, attaching directly above rearward roller 82 is the most easily facilitated because height adjusting bracket 40 typically includes several bores for adjusting the height of rollers 82. Roller units 12 are preferably attached directly above roller 82. It is also important to note that the frame is attached lower than forward axis 88 but higher than rearward axis 89. The result being that the force (Fp) supplied by pulling the gang mower always intersects a line 90 connecting axis 88 and axis 89. The result being that each individual mower unit is leveraged downward when pulled forward to increase the friction contact between drive wheels 80, 81 and the ground. This contrasts with the Tobin connection via a bracket 111 that attaches to handle studs 86. Handle studs 86 are typically located relatively close to forward axis 88. Thus in the Tobin mower, the majority of the frame's weight is supported by the forward wheels rather than the rear roller. The consequence being that the rear roller tends to bounce along the ground when the Tobin mower is pulled forward. Tobin attempted to eliminate this problem by including a spring which constantly supplies a restoring moment to maintain the rollers in contact with the ground. The present invention solves the roller bouncing problem inherent in the Tobin gang mower.

It should be understood that the above description is intended to serve only in aiding those skilled in this art to understand the present invention, and is therefore intended for illustrative purposes only. Although a number of enhancements to the present invention have been discussed above, those skilled in the art may also recognize additional enhancements to the present invention. For instance, a spiked roller could be substituted for the smooth rollers 82 illustrated for purposes of allowing the user to aerate their lawns as they mow. Another variation might be the inclusion of a slightly modified hitch so that the present invention could be pulled by a horse or other draft animal. Still another variation might be accomplished by utilizing reel-type mowers that have no rear roller. In such a case, the frame might be supported by its own rollers or wheels attached at strategic locations with the ability to adjust the height of the frame off the ground in order to adjust the cutting height of the individual mower units. Thus, while it may be preferable to use off the shelf reel-type mowers, modifications can be made to the illustrated invention without departing from the intended scope of the present invention.

Still other enhancements to the present invention might include utilizing the present frame with a plurality of golf ball retrievers substituted in place of the reel-type mower units. Such an alternative might prove attractive in retrieving balls at driving ranges. The present invention could also be utilized as a trailer for a number of other lawn implements including aerators, fertilizer units, or any other suitable lawn implement that could be substituted for the reel-type mower units illustrated. There is also the possibility of attaching implements requiring electrical power to the frame of the present invention and supplying power via a hook up to the alternator or battery of the garden tractor. This possibility may be especially attractive in attaching a number of weed eater units to the frame in order to cut any stemmy weeds or fesque grasses that are difficult to cut in a single pass with a reel-type mower. Finally, there is also the possibility of mounting a fertilizer tank on the frame and running a number of nozzles from the tank along the rearward base of the frame so that the user could distribute liquid fertilizers over their lawn while cutting. Thus, the above description is clearly not meant to limit in any way the intended scope of the present invention, which is defined solely in terms of the claims as set forth below.

I claim:

1. A gang mower frame for use with a plurality of reel-type mowers, each having forward wheels separated from a rear roller, the frame comprising:

a forward sub-frame;

a rearward sub-frame arranged behind and substantially parallel to said forward sub-frame;

at least one connecting member having a forward end rigidly attached to said forward sub-frame and a rearward end rigidly attached to said rearward sub-frame;

a plurality of first brackets attached to said forward sub-frame and being sized and positioned for connection to at least one reel-type mower at a location closer to the rear roller than the forward wheels; and a plurality of second brackets attached to said rearward sub-frame and being sized and positioned for connection to at least one reel-type mower at a location closer to the rear roller than the forward wheels.

2. The gang mower frame of claim 1 further comprising:

a forward-left sub-frame attached at a forward-left contour pivot to said forward sub-frame, and said forward-left sub-frame can pivot about a horizontal axis with respect to said forward sub-frame;

means for attaching said forward-left sub-frame to at least one reel-type mower at a location closer to the rear roller than the forward wheels;

a forward-right sub-frame attached at a forward-right contour pivot to said forward sub-frame, and said forward-right sub-frame can pivot about a horizontal axis with respect to said forward sub-frame;

means for attaching said forward right sub-frame to at least one reel-type mower at a location closer to the rear roller than the forward wheels; and said horizontal axes are parallel to one another and substantially perpendicular to said forward sub-frame.

3. The gang mower frame of claim 2 further comprising:

a rearward-left sub-frame attached at a rearward-left contour pivot to said rearward sub-frame, and said rearward-left sub-frame can pivot about a horizontal axis with respect to said rearward sub-frame;

means for attaching said rearward-left sub-frame to at least one reel-type mower at a location closer to the rear roller than the forward wheels;

a rearward-right sub-frame attached at a rearward-right contour pivot to said rearward sub-frame, and said rearward-right sub-frame can pivot about a horizontal axis with respect to said rearward sub-frame;

means for attaching said rearward right sub-frame to at least one reel-type mower at a location closer to the rear roller than the forward wheels; and said horizontal axes are parallel to one another and substantially perpendicular to said forward sub-frame.

4. The gang mower frame of claim 3, wherein said forward-left sub-frame, said forward right sub-frame, said rearward-left sub-frame and said rearward-right sub-frame are identical in shape and structure.

5. The gang mower frame of claim 4, wherein said forward-left sub-frame, said forward-right sub-frame, said rearward-left sub-frame and said rearward-right sub-frame can pivot to an upright stowed position; and the gang mower frame further comprises means for locking said forward-left sub-frame, said forward-right sub-frame, said rearward-left sub-frame and said rearward-right sub-frame in said stowed position.

6. The gang mower frame of claim 1 wherein a majority of said frame is positioned below the axis of the forward wheels of the reel-type mowers.

7. A gang mower frame consisting essentially of a forward sub-frame that includes a tubular stock;

a rearward sub-frame that includes a tubular stock oriented in parallel to said tubular stock of said forward sub-frame;

at least two stiffeners interconnecting said forward sub-frame to said rearward sub-frame;

a plurality of first brackets attached to said forward sub-frame and being sized and positioned for connection to at least one reel-type mower at a location closer to the rear roller that the forward wheels; and a plurality of second brackets attached to said rearward sub-frame and being sized and positioned for connection to at least one reel-type mower at a location closer to the rear roller than the forward wheels.

8. The gang mower frame of claim 7 wherein said at least two stiffeners are arched stiffeners.

9. The gang mower frame of claim 7 further consisting essentially of a hitch attached to said frame with a plurality of third brackets attached to said forward sub-frame at a pivot point; and said hitch being pivotable with respect to said frame about a horizontal axis.

10. The gang mower frame of claim 7 further consisting essentially of a forward-left sub-frame attached at a forward-left contour pivot to said forward sub-frame, and said forward-left sub-frame can pivot about a horizontal axis with respect to said forward sub-frame;

a forward-right sub-frame attached at a forward-right contour pivot to said forward sub-frame, and said forward-right sub-frame can pivot about a horizontal axis with respect to said forward sub-frame;

said horizontal axes are parallel to one another and substantially perpendicular to said forward sub-frame;

a rearward-left sub-frame attached at a rearward-left contour pivot to said rearward sub-frame, and said rearward-left sub-frame can pivot about a horizontal axis with respect to said rearward sub-frame;

a rearward-right sub-frame attached at a rearward-right contour pivot to said rearward sub-frame, and said rearward-right sub-frame can pivot about a horizontal axis with respect to said rearward sub-frame; and said horizontal axes are parallel to one another and substantially perpendicular to said forward sub-frame.

11. The gang mower frame of claim 7 wherein said forward-right sub-frame, said forward-left sub-frame, said rearward-right sub-frame and said rearward-left sub-frame are pivotable about vertical axes which are substantially perpendicular to said horizontal axes.

12. The gang mower frame of claim 7 further consisting essentially of a means for locking said forward-right sub-frame, said forward-left, sub-frame, said rearward-right sub-frame and said rearward-left sub-frame into an upright, stowed position.

* * * * *